United States Patent [19]

Kelly

[11] 4,078,168

[45] Mar. 7, 1978

[54] POWER CONTROL CIRCUIT

[75] Inventor: Richard A. Kelly, Prospect Heights, Ill.

[73] Assignee: Flinn & Dreffein Engineering Company, Northbrook, Ill.

[21] Appl. No.: 724,386

[22] Filed: Sep. 17, 1976

[51] Int. Cl.² .............................................. H05B 1/02
[52] U.S. Cl. ..................................... 219/497; 219/482
[58] Field of Search ............... 219/494, 497, 499, 501, 219/482; 323/19, 35, 36

[56] References Cited

U.S. PATENT DOCUMENTS 3,553,429  1/1971  Nelson ................................. 219/497
3,752,956  8/1973  Cahill et al. ......................... 219/497
3,789,190  1/1974  Orosy et al. ......................... 219/497

Primary Examiner—J. V. Truhe
Assistant Examiner—Fred E. Bell
Attorney, Agent, or Firm—McDougall, Hersh & Scott

[57] ABSTRACT

Electric process heating control includes a combination of (1) pyrometric temperature controller providing a DC control signal wherein the ratio of "on" time to "off" time is proportional to the deviation of temperature from set-point value and to the duration of such deviation, (2) phase-angle-fired power controller, and (3) current limiter for altering the phase angle firing of the power controller.

9 Claims, 2 Drawing Figures

POWER CONTROL CIRCUIT

BACKGROUND OF THE INVENTION

This invention pertains to a novel and unique combination of pyrometric temperature control apparatus including a silicon controlled rectifier power controller incorporating current or power limiting means and other advantageous features. The combination is particularly adapted to the control of temperature in process heating equipment but is not to be construed as limited thereto.

In recent years, static power controllers have been developed which provide what is termed Stepless Control or Phase-Angle Firing Control. These static power controllers usually combine silicon controlled rectifiers and, sometimes diodes, with gating or triggering circuitry which causes the SCR's to conduct during some portion of 180 electrical degrees or half of the sine wave of conventional alternating current electrical power. The control may be either half-wave or full-wave depending upon the configuration of the components of the apparatus. The SCR's are said to "fire" at some angle of the half-sine-wave (firing angle) which may be delayed after the beginning of the sine wave at 0° (electrical) and 0 voltage. The SCR's turn off when the voltage reaches zero at 180° (electrical). The negative half of the voltage sine wave is similarly handled by another SCR which is inversely paralleled with the SCR. In 3-phase configurations, the returning current may be conducted by diodes inversely paralleled with respect to the SCR's.

As the firing angle of the SCR's is increasingly delayed, the portion of a half cycle during which the SCR's conduct becomes shortened. During the blocking portion wherein the SCR does not conduct, no power is delivered. Therefore, as the firing angle is delayed (phased back) less power is transmitted into the load. In prior systems the phase-back angle has commonly been made proportional to the error of temperature of the process in relation to the temperature setpoint.

Another type of prior solid state control of electrical power is commonly called "Time Proportional" or "Synchronous Firing" wherein bursts of power comprising one or more complete cycles of alternating current power are permitted to pass through the SCR's and wherein other cycles of the alternating current power are caused to be blocked by the SCR's. A variation in the proportion of cycles fired to the cycles blocked effectively determines the average value of power which is permitted to enter the load. The ratio of fired cycles to blocked cycles is proportional to the deviation of the process temperature from setpoint temperature. Turn on occurs at substantially zero voltage and turn off is likewise at zero voltage.

One important application of phase-angle SCR control is to limit current or power to effectively compensate for such factors as variation in line voltage or load resistance. Without the limits available only with phase-angle SCR control, power into a resistive load would increase as the square of the supply voltage. Also, without the inherent limits applicable with phase-angle control, electrical current would increase inversely as resistance of the load. Thus, phase control is preferred for these applications over Synchronous Firing. The current limit available with phase-angle control even permits transformer coupling of the load. The inrush of current to a transformer coupled load would be untenable with the Synchronous Firing technique.

In spite of the seemingly greater advantages of phase-angle control versus synchronous control, there are serious disadvantages associated with prior adaptations of phase-angle control to process heating and other applications.

It is an object of this invention to minimize or eliminate the disadvantages of phase-angle SCR control of electrical power.

It is another object of the invention to utilize phase-angle control in combination with proportional control to avoid severe phase-angle reductions.

It is another object of the invention to provide a system which employs phase-angle control but which avoids generating radio frequency interference due to large phase-back angles.

It is a further object of the invention to provide a current limited phase-angle control system.

Other objects and advantages of the invention will be apparent from the remaining portion of the specification.

DETAILED DESCRIPTION

Figure 1:
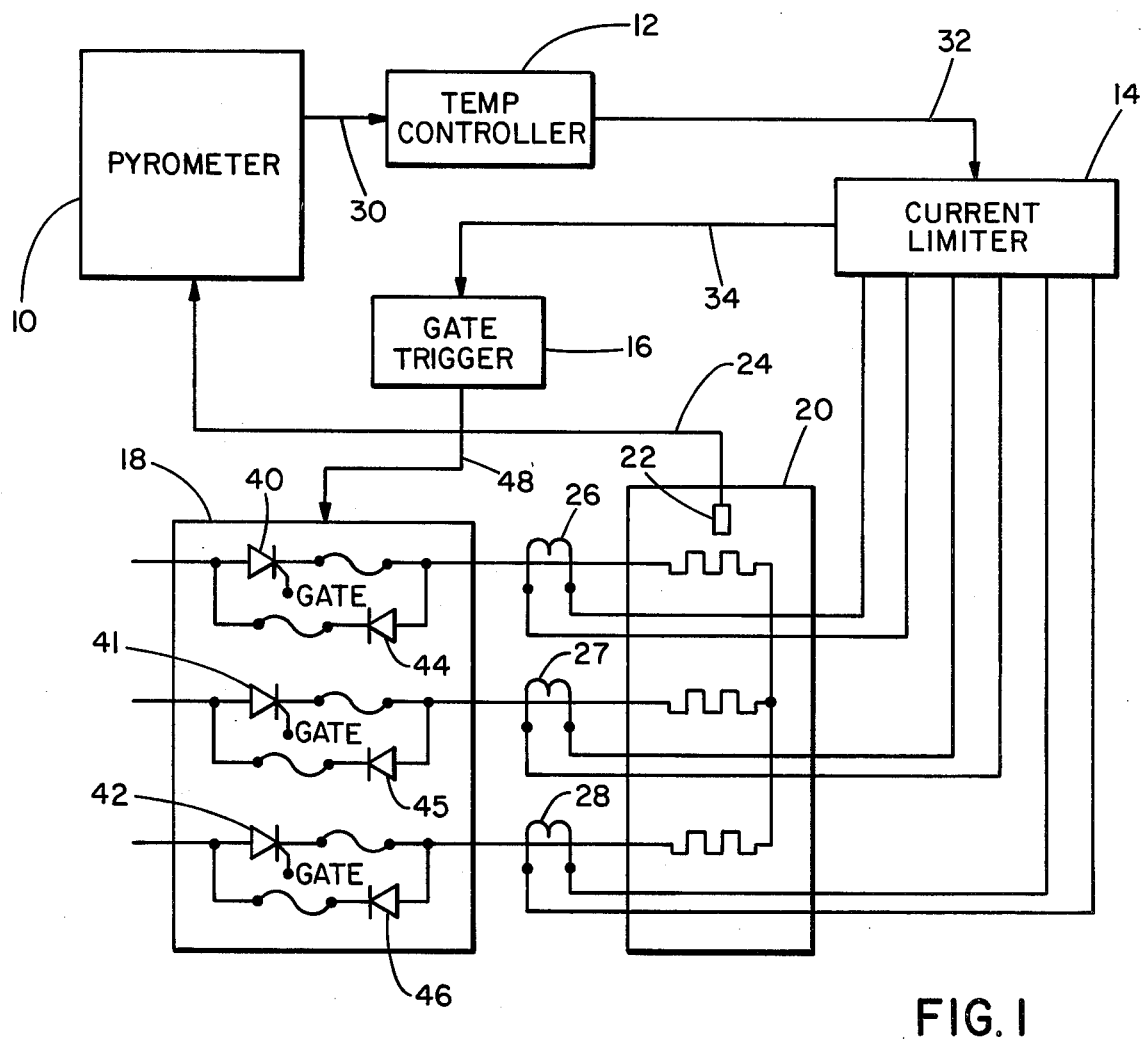
FIG. 1 are wave form diagrams useful in explaining the operation of the invention.

Process heating employing electrical resistive heating means usually presents a thermal time constant that is measured in minutes or seconds. Therefore, the millisecond and even microsecond switching control inherent to SCR's is of no practical consequence to most equipment employed in process heating.

A metallurgical furnace employed for austenitizing carbon steel for hardening would operate at a controlled temperature of 1600°–1800° F and might require for rated production an energy input of 2500 kilowatts of electric power. Such a furnace could be deprived of any new power for several seconds without impairing the quality of the heat treatment. In fact, several minutes of zero power input would have to occur before production would be affected. However, were production to be suddenly curtailed for several minutes to an hour, power input would require curtailment approximating 80–90% of the rated power of the heating resistors.

With prior combinations of temperature control apparatus and phase-angle controlled SCR's, such a condition might have required phasing back 120°–130° or else instrumentation provided for excessive temperature shut-down would have to intervene for emergency shut-down of all power. Severe phasing back such as 120°–130° produces a severe radio frequency interference and a poor power factor of 50% or less.

According to the invention pyrometry and power control components control the furnace temperature without severe phase-back angle and without intervention of manual or emergency equipment.

An output signal derived from a pyrometer-controller deprives the phase-angle controlled SCR's of a gating signal whenever severe phasing back would be required, i.e., when temperature is at or over set point.

Another problem solved by phase-angle control relates to the resistance change of metallic heating elements from a cold start-up to operating temperature.

Without current limiting, the current inrush into cold resistors will increase above an intended value.

To avoid this dangerous over current condition, the SCR firing angle usually has to be delayed up to only about 60°.

As mentioned, one disadvantage of phase-angle SCR control is its proclivity for generating radio frequency interference (RFI). Owing to the steep value of dv/dt occasioned upon firing of the SCR within possibly 200 to 300 microseconds after gating of the SCR, odd numbered harmonics of the fundamental frequency of 60 Hz are generated. Some of these harmonics are of high enough frequency to interfere with radio and telephone and other sensitive equipment. The development of such harmonics is minimized by limiting the value of the phase-back firing angle. By not employing phasing back for reduction of power beyond the requirements, occasioned by excessive line voltage, low resistance due to cold heating elements or start-up, etc., it is necessary to phase-back only a few degrees and less than 60° in any event normally encountered RFI is minimized by this feature of the present invention.

The combination of phase-angle firing control and pulsed temperature control providing a ratio of on time to off time proportional to deviation of temperature from a set point will accomplish process temperature control without excessive delay in the firing angle of SCR's.

Referring to FIG. 1, the basic wave forms relating to phase-angle control are illustrated. Assuming a one phase system for ease of discussion, wave form A illustrates a typical AC sine wave voltage. As measured from the zero crossing of the line voltage, wave form B illustrates the gating pulses utilized for a 60° phase-back while wave form C illustrates the resulting load voltage.

Wave form D illustrates the gating pulses for 120° phase-back. This wave form would obtain where the process temperature exceeds the set point and, accordingly, it is desired to apply very little power to the resistive heating elements in the system. As indicated in wave form E, the applied load voltage under such circumstances is severely reduced. The wave forms D and E illustrate the operating condition which is eliminated by the present invention. When operating under conditions of severe phase-back the RF interference problem arises, the power factor drops precipitiously and other undesirable characteristics occur. According to the present invention, when severe phasing back would be required by prior systems, the present invention simply eliminates all gate pulses. This is permissible in view of the aforementioned large thermal time constant of typical process heating systems. As indicated earlier, power can be removed from such a process for up to several minutes without adversely affecting the process.

Figure 2:
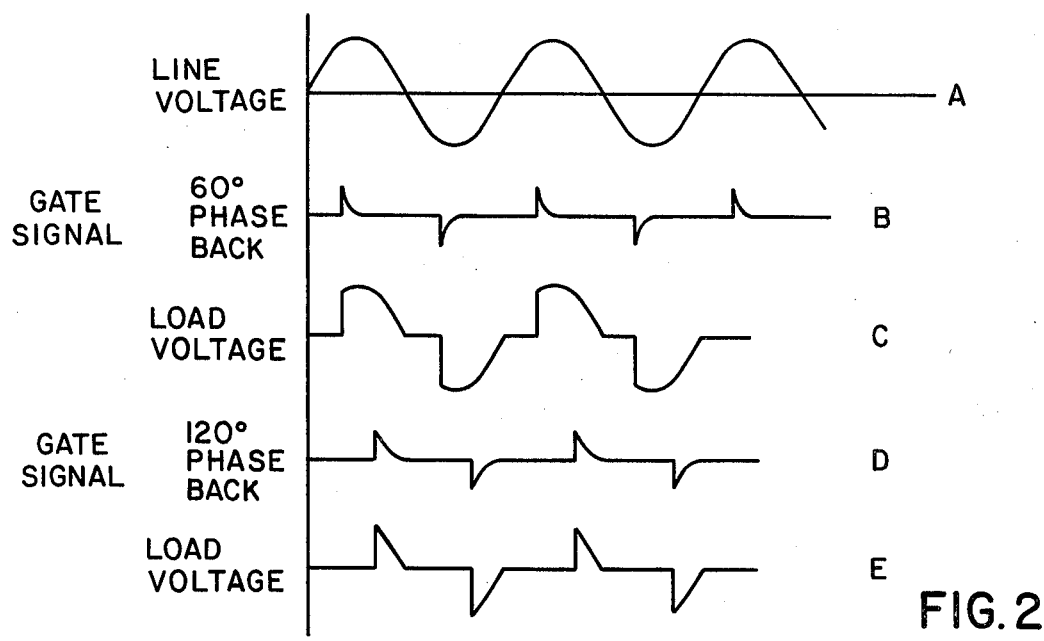
FIG. 2 is a block schematic diagram of a circuit according to the present invention.

Referring to FIG. 2, a circuit according to the invention is illustrated in block schematic form. The system employs a number of components including a pyrometer 10, a temperature controller 12, a current limiter 14, a gate trigger unit 16 and a power controller 18. For purposes of discussion, the power controller is illustrated as applying power to a resistive load 20 which is illustrated as including wye connected resistive heating elements. Obviously other types of loads can be employed, as desired. The temperature produced by the resistive heating elements is monitored by a conventional temperature sensor 22 and feed back via line 24 to the pyrometer. Current supplied from the controller to the load is monitored by current sensing transformers 26, 27 and 28. These transformers are part of the current limiter 14.

The pyrometer 10 is an instrument known in the art which converts the output of the temperature sensor 22, such as a thermal couple, etc., to a temperature signal and which compares the converted signal to a set point temperature reference. The pyrometer compares the set point temperature with the process temperature and produces an output which is proportional to the error between the set point and the process temperature. According to the invention this error signal is provided on line 30 to the temperature controller 12. The temperature controller is a device which adjusts the percentage of on time of its output signal according to the received error signal. The temperature controller may be of a commercially available type as, for example, a Leeds and Northrup Series 80 D.A.T. controller. Such a controller can produce time proportioning. That is, the output from the controller will be a DC signal wherein the ratio of on time to off time over a selected period, such as 30 seconds, varies with the input on line 30. Such a device may employ proportional, reset, rate and approach circuits to accurately carry out this function. The important thing to recognize is that the output signal ratio of "on" time to "off" time is proportional to the duration of the error signal.

Summarizing the system thus far, the pyrometer detects the temperature of the process and compares it with a set point temperature. An error signal indicative of the difference between the two temperatures is applied to the temperature controller 12. Responsive to the magnitude and duration of the error signal, a pulsed or switched DC signal is produced on line 32.

The DC signal is applied to the gate trigger unit 16 by way of the current limiter 14. The current limiter measures the current supplied to the load via sensing transformers 26 through 28 and serves to automatically limit that current to some preselected value. Assuming the current applied to the load is at or below the preselected maximum, the DC signal applied to the current limiter on line 32 is provided to the gate trigger unit 16 without modification via line 34. The full signal on line 34 causes the gate trigger unit 16 to fire the SCR's in phase with the power wave form zero crossings whenever the DC signal is present.

Summarizing this portion of the circuit, it will be seen that the gate trigger unit is operated only when the temperature controller provides an "on" signal on line 32. Since this signal is related to the error between the set point and the process temperature, when the two temperatures are relatively close together, the gate trigger unit will be operated only infrequently during a period of operation, for example, 30 seconds.

A principal feature of the present invention is the ability of the current limiter 14 to alter, i.e., modulate, the DC signal on line 48 when the detected current to the load exceeds the preselected maximum. In such case the current limiter modulates the signal to cause a change in the firing angle of the SCR's, i.e., it produces phase-back.

The current limiter 14 will sense excessive current, for example, during start-up or subsequent to start-up and will limit the power applied to the load to the value for which it is preset. The current limiter permits the SCR power controller 18 to safely fire into a resistance value which may be significantly less than normal during start-up or, in the case of a component failure, a direct short circuit without damage to the power controller. By the term modulating it is meant, for the purposes of this application, that the full signal on line 32 is reduced in value from its full "on" value to some lesser value. When the full signal on line 34 is applied to the gate trigger unit, the phase back on the SCR's is approximately zero. Reducing the value of the signal on line 34 progressively increases the amount of phase-back produced by the gate trigger unit in firing the SCR power controller.

The gate trigger unit 16 receives and produces an output signal causing the SCR's of the power controller 18 to fire at an appropriate point on the power wave form as illustrated in FIG. 1. This unit and the power controller are commercially available.

The power controller 18 is a solid state switching device which passes an electric current to a load. A three phase power controller is illustrated and includes SCR's 40, 41 and 42 with diodes 44, 45 and 46 provided for the negative half cycle of the power wave form. Appropriate fuses are provided to protect the components. A typical available unit is the Robicon power controller.

The current limiter 14 may be of a commercially available type as, for example, available from Robicon.

This disclosure should not be contrued as limited to process heating loads and their control but as equally applicable to any electric power load which has a time constant which is large in comparison to the timing interval of the temperature controller. Such loads can be similarly benefited by this use of restricted phase-angle firing of SCR's and pulsed signals wherein the ratio of "on" time to "off" time is proportional to the error between set point and present state of the process.

Owing to the highly undesirable aspects of lagging current in electric power circuits and sometimes proscribed values of power factor less than 0.85, this unique combination of instrumentation and control devices constitutes a valuable improvement in the solid state switching art for controlling electric power. The advantages of phase-angle firing of SCR's are retained without incurring the disadvantages of greatly reduced power factor and excessive electrical "noise" in the power distribution system and the power generating and utilization equipment.

Advantage Summary

| | Prior Art Synchrounous Firing | Prior Art Phase-Angle Firing | Present Invention Time Dividing + Phase-Angle Firing |
|---|---|---|---|
| Can be severely overloaded with excess line voltage | yes | no | no |
| Can be overloaded with reduced load resistance | yes | no | no |
| Can be damaged by firing into short circuit | yes | no | no |
| Protects against excess current | no | yes | yes |
| Poor power factor (line) at less than 75% load | no | yes | no |
| Excessive RFI | no | yes | no |
| Maximum dp/dt can be suppressed | no | yes | yes |
| Can fire into transformer coupled load | no | yes | yes |
| Can fire into reactive plus resistance load | no | yes | yes |
| Can accept severe phase imbalance | no | yes | yes |

While I have shown and described embodiments of this invention in some detail, it will be understood that this description and illustrations are offered merely by way of example, and that the invention is to be limited in scope only by the appended claims.

I claim:

1. A system for phase angle regulation of electric power without excessive phase back applied to a process comprising:
   (a) means for detecting a process condition related to the applied power and producing a signal representative thereof,
   (b) means receiving said signal for comparing the value thereof against a preset value and for producing an error signal representative of the difference therebetween,
   (c) means receiving said error signal for producing a DC signal of a fixed magnitude wherein the percent of time over a selected period the DC signal is produced is proportional to the duration of said error signal,
   (d) means for controlling power applied to said process including at least one power switching device operated by application of said DC signal, said controlling means switching synchonously with the power wave form at a point thereon determined by the magnitude of said DC signal, and
   (e) means for limiting the power applied to said process to a preselected maximum by reducing the magnitude of said DC signal supplied to said controlling means thereby to produce phase back of the switching point of said switching device when excessive power is detected.

2. The system according to claim 1 wherein the process employs process heating equipment to which electric power is applied.

3. The system according to claim 2 wherein said detecting means is a temperature sensor.

4. The system according to claim 1 wherein said comparing means is a pyrometer.

5. The system according to claim 2 wherein said comparing means is a pyrometer which compares the set point temperature against the process temperature.

6. The system according to claim 1 wherein said producing means is a duration-adjusting-type (DAT) temperature controller.

7. The system according to claim 1 wherein said controlling means is a SCR power controller including a gate trigger unit to which said DC signal is applied, the magnitude of the DC signal applied to the gate trigger unit determining the firing point of the SCRs with respect to the power wave form.

8. The system according to claim 1 wherein said limiting means is a current limiter including current sensing transformers, said current limiter being interposed between said producing means and said controlling means to reduce the value of the DC signal when said current sensing transformers detect excessive current being applied to said process.

9. The system according to claim 8 wherein said current limiter means will reduce the magnitude of the DC signal by a preselected maximum amount, which maximum will not cause phase back of more than approximately 80° with reference to the zero crossing of the power wave form.

* * * * *